W. L. BURNHAM.
SAFETY HOOK.
APPLICATION FILED JULY 17, 1911.
1,068,313.
Patented July 22, 1913.
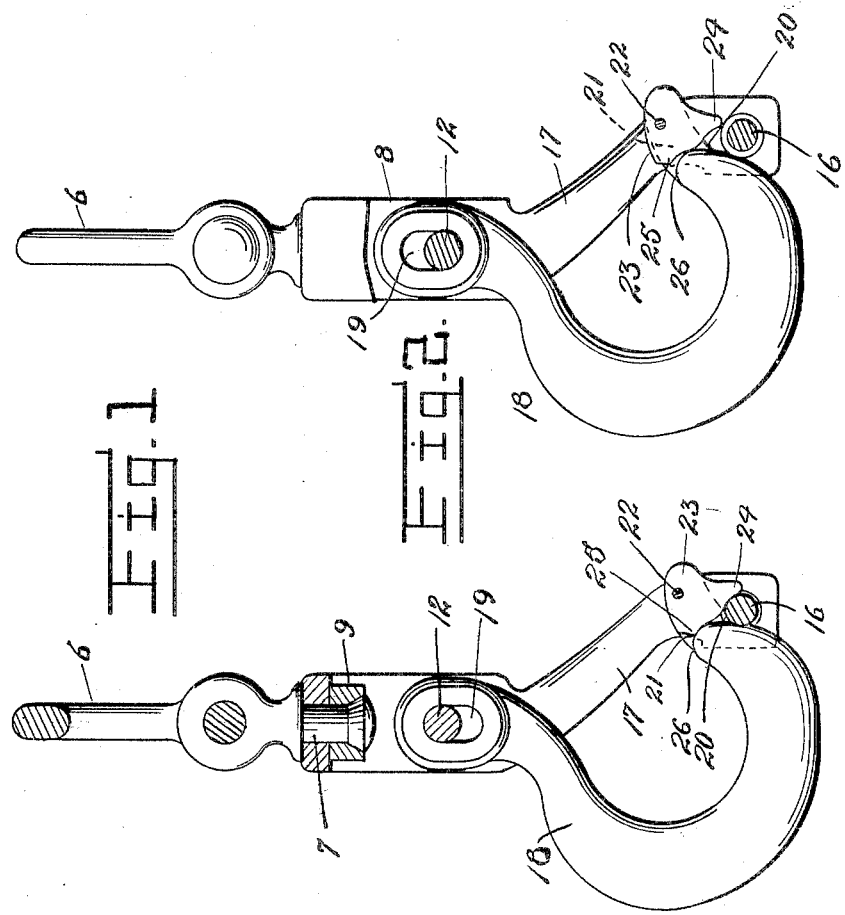
Witnesses
Charles J. MacCartu
H. K. Parsons
Inventor
W. L. Burnham.
By Harry Ellis Chandlee
Attorney

UNITED STATES PATENT OFFICE.

WARREN L. BURNHAM, OF VALLEJO, CALIFORNIA.

SAFETY-HOOK.

1,068,313.  Specification of Letters Patent.  Patented July 22, 1913.

Application filed July 17, 1911.  Serial No. 639,020.

*To all whom it may concern:*

Be it known that I, WARREN L. BURNHAM, a citizen of the United States, residing at Vallejo, in the county of Solano and State of California, have invented certain new and useful Improvements in Safety-Hooks, of which the following is a specification.

My invention relates to improvements in safety hooks, and has for its leading object the provision of an improved hook of such construction that it will readily and firmly engage an eye bail or loop of rope or chain and in which lifting strain upon the said safety hook device will serve to throw closed or lock the point of the hook as to absolutely prevent disengagement of the article held by the hook until the safety hook device has been relieved of the strain of supporting the said article.

The further object of my invention is the provision of an improved supporting frame and hook for use in connection therewith, which frame will be of such construction that when an article is engaged on the hook and a lifting force is exerted against the said frame the frame will so move relative to the hook as to change the hook into a closed loop which will securely retain the article engaged on the hook in position.

Other objects and advantages of my improved safety hook will be readily apparent by reference to the following description taken in connection with the accompanying drawings, and it will be understood that I may make any modification in the specific structure shown and described within the scope of my claim without departing from or exceeding the spirit of my invention.

In the drawings: Figure 1 is a side elevation of my hook, showing the same in locked position with parts shown in section. Fig. 2 represents a similar view showing the hook in inoperative position with the parts unlocked ready to disengage the hook from the article supported thereby.

The hoisting rope is adapted to be engaged in the eye portions 6 of the bolt 7 which passes downwardly through and is rotatably mounted in a socket formed centrally in the U-shaped yoke or frame member 8, said bolt having engaged on its lower end the nut 9. The U-member 8 is provided with the depending curved arms 17 connected by the rivet 16 which is mounted to rotate to prevent wearing of but one side of said rivet, while passing through the parallel portions of the frame 8 is the pivot bolt 12. Pivotally engaged upon the said bolt 12 is the arc shaped hook 18 which has an elongated slot 19 formed therein through which the bolt 12 passes, said hook 18 having formed in its free end the recess 20 beyond which extends the portion 21 of reduced thickness.

Pivoted to the outer end of the reduced portion 21 on the rivet 22 is the improved locking plate 23 of my hook. Said plate 23 has a depending rounded lug 24 which is adapted to bear against the rivet 16 as the hook 18 is swung into closed position, the rivet forcing the plate upward until the rivet has passed into the recess 20, when the lug 24 will have been carried past the rivet and the weight of the plate on account of the position of its pivot 22 will swing the same downward to rest against the outer face of the rivet and thus absolutely prevent disengagement of the hook from between the arms 17. To limit the movement of the plate and prevent the same from being swung into releasing position by pressure of the rivet 16 against the inner face of the lug 24, I form upon the inner edge of said plate a socket 25 which serves to rest against the shoulder 26 formed on the end of the larger portion of the hook 18.

By reference to the drawings the construction and operation of my improved form of safety hook will be readily apparent, and it will be seen that when a weight is engaged in the hook 18, the hook will be shifted downward to cause the bolt 12 to lie in the upper end of the slot 19, but when the weight is released from the hook 18, the hook may then be slid upward, the bolt moving in the slot 19 and when the hook is so raised the lug 24 will then lie above the rivet 16 when the parts may then be readily swung apart.

It will thus be seen that I have provided an improved form of safety hook which will be positively locked in closed position and which will consequently be particularly valuable when my hook is being used to handle articles of a breakable character or articles of extreme value where it is desired to employ every possible safeguard to prevent dropping of the same.

I claim:

The combination with a U-shaped frame having depending curved arms in spaced parallel relation of a bolt connecting the lower ends of said arms, a transversely extending bolt connecting the parallel arm portions of the U-shaped frame, a hook member having an elongated slot formed at one end through which said second bolt passes, the bill of the hook having a reduced and outwardly bent extension offset from the center and a shoulder formed at the juncture of the extension and the end of the bill, a locking plate pivoted adjacent one side thereof and intermediate of said side and the extension, said plate having a face extended past the extension of the bill and forming with the bill a V-shaped notch for engagement with the first mentioned plate and said face adapted to bear against the said shoulder to prevent rotation of the plate.

In testimony whereof I affix my signature, in the presence of two witnesses.

WARREN L. BURNHAM.

Witnesses:
 GRACE CLARKE,
 HARLOW V. GREENWOOD.

---

Copies of this patent may be obtained for five cents each, by addressing the "Commissioner of Patents, Washington, D. C."